Oct. 2, 1934.  E. F. OATES  1,975,119
STABILIZER
Original Filed Jan. 23, 1929  2 Sheets-Sheet 1
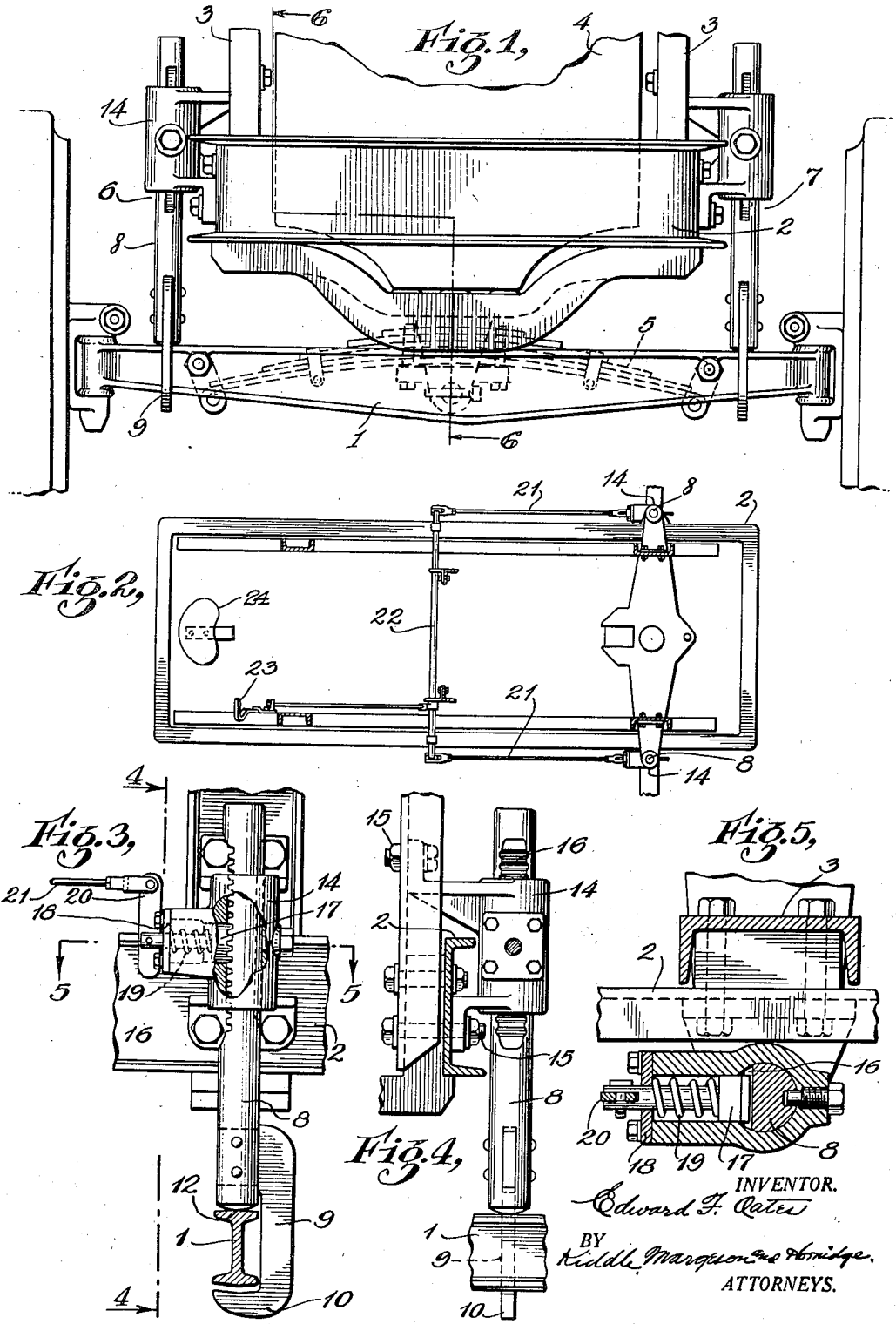

Oct. 2, 1934.  E. F. OATES  1,975,119
STABILIZER
Original Filed Jan. 23, 1929  2 Sheets-Sheet 2

Edward F. Oates.
INVENTOR.
BY Hoar, Ruhloff & Arnaud
ATTORNEYS.

UNITED STATES PATENT OFFICE 1,975,119

STABILIZER

Edward F. Oates, Flushing, N. Y., assignor, by mesne assignments, to Bucyrus-Erie Company, South Milwaukee, Wis., a corporation of Delaware Application January 23, 1929, Serial No. 334,550
Renewed April 6, 1933

18 Claims. (Cl. 280—6)

My invention relates to an improvement in stabilizers and is particularly directed to stabilizing mechanism or stabilizing apparatus adapted for use with power units comprising an axle, a load and propulsion mechanism.

One of the objects of my invention is the provision of a stabilizing mechanism for power units such as above referred to which will enable the unit to handle heavier loads than heretofore possible with such a machine.

More specifically, the invention relates to tractors comprising propulsion mechanism, an axle and material handling apparatus of some kind such for instance as a crane, the crane structure being superimposed upon and attached to the tractor.

A further object of this invention is the provision of an apparatus of the character above indicated which adapts the machine for the moving of a load from one point to another without injury to the machine due to the same passing over rough roads, the stabilizing mechanism also being of such a character that when the same is at rest the load may be swung to one side and deposited in desired position without danger of upsetting the tractor, the capacity of the present apparatus being much greater than that of existing tractors or power units of similar type.

In the drawings accompanying this application,

Fig. 1 is a front view of a part of a machine equipped with the stabilizers of this invention;

Fig. 2 is a plan view thereof;

Fig. 3 is a detail view thereof in partial section;

Fig. 4 is a section on the line 4—4 of Fig. 3;

Fig. 5 is a section on the line 5—5 of Fig. 3; and

Figure 6:
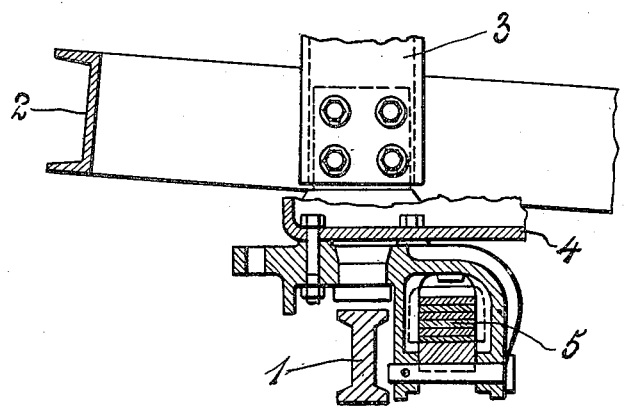
Fig. 6 is a section on the line 6—6 of Fig. 1.

Referring to the drawings in detail, units to which the present invention is particularly applicable essentially comprise an axle 1 and a structure which is hereinafter designated as a load. In the illustration of the drawings, the load comprises frames 2 and 3 and propulsion mechanism together with material handling mechanism, such as a crane for instance.

As is obvious from an inspection of Fig. 1, the word "axle", as applied to my invention does not mean a transverse member the ends of which are machined to serve as bearings for wheels, but rather means any transverse load-supporting member, the ends of which are adapted to be supported by traction elements. It is in this broader sense that the word "axle" will be used throughout the specification and claims.

The power unit of which the axle and load are a part may be in the nature of a tractor, for instance, capable under its own power of moving from one point to another. The frame 2 is mounted on a spring 5 secured at each end to the axle 1. For this purpose the frame may be secured to the center of the spring 5 in any convenient manner. Or, if the spring 5 be omitted, the frame can be pivoted at the center of the axle 1 in any convenient manner. The details of alternatively securing the frame to the center of the spring or to the center of the axle are not shown, as they are well known in the art, and furthermore constitute details which form no part of the present invention.

Under the present invention it is desirable to employ a pair of stabilizers, one at each side of the machine, these stabilizers being mounted adjacent the outer ends of the axle 1. The two stabilizers, as here illustrated, are designated 6 and 7 and inasmuch as the stabilizers are the same in their construction one of them only will be described in detail.

Each stabilizer comprises a longitudinally movable rigid member 8 interposed between the load, i. e., frames 2 and 3, etc. and the axle 1. In the embodiment of the present invention as illustrated, the plunger immediately overlies the axle and when in stabilizing position contacts therewith as will be explained hereinafter. The plunger, as above noted, is of rigid construction and it may have attached to it pivotally or formed integral therewith so as to be rigid with the plunger a hook shaped member 9, this member or hook extending laterally with respect to the plunger and in the embodiment illustrated downwardly in front of the axle 1, then rearwardly as indicated at 10 so as to underlie the axle.

The lower end of the plunger 8, designated 12, is rounded off as shown so as to always present a proper bearing surface to the outer face of the axle 1. As the axles, such as 1, are usually forgings they are not of uniform dimension. Accordingly the hook shaped extension 9 of the plunger 8 is constructed so that the distance between the lower end 12 of the plunger and the upper face of the underlying portion 10 of the plunger extension is slightly greater than the depth or the width of the axle. This adapts the hooked member 9 for all axles which by reason of their process of manufacture may vary slightly in dimensions.

The plunger 8 is actuated in a mount or bearing 14 rigid with the load, i. e., rigid with both frames 2 and 3, being conveniently secured to the frame members by bolts 15.

As so far described, therefore, the present invention provides a stabilizer intermediate a load and an axle, the stabilizer comprising a rigid member having longitudinal or lengthwise movement in a fixed bearing, this bearing being rigidly secured to the load while the movable rigid member contacts with the axle. In addition means are provided for receiving the axle, such as the hook 9.

The plunger 8 is provided with means for holding the plunger against longitudinal movement under certain conditions and in the embodiment herein shown such means are teeth 16 provided on the face of the plunger and cooperating with a pawl 17. The pawl is mounted for movement perpendicular to the plunger 8 in a bracket or other suitable support 18 and the stem thereof carries a spring 19 exerting pressure on the pawl in the direction of the plunger. The teeth 16 and pawl 17 together constitute locking mechanism for holding the plunger against movement in its bearing.

The stem 18 of the pawl is secured to a short lever 20 to which is attached a rod 21 extending rearwardly of the apparatus. The rear end of this rod is attached to a tie rod 22 extending transversely of the machine, this tie rod being operable by handle 23, which is located adjacent the control station 24 of the machine. The parts are so arranged that by pulling the handle 23 to the left as viewed in Fig. 2 motion will be imparted in the same direction to the rods 21 to retract the pawl 17 out of holding position, it being noted that the tie rod 22 is connected to the two rods 21 which are connected to the stabilizer at each side of the machine. This construction, i. e. retraction of the pawls 17 simultaneously, is optional inasmuch as these pawls may be retracted independently of each other.

When the power unit is in transit under its own power the pawls 17 will be released from engagement with the plungers 8 allowing the load on the axle to move with the spring 5, if a spring be employed. The axle 1 is also free when the apparatus is in transit to move at will relatively to the load. This freedom of movement between the load and the two ends of the axle with the apparatus in transit is permitted in those types of machine where the spring 5 may be omitted and the load be pivoted upon the center of the axle 1. At rest, with the plungers 8 engaging the upper face of the axle 1, the pawls 17 are moved to locking position to then perform their function as stabilizers, obviously preventing any movement of the load relatively to the axle either as a whole, or by tilting the axle.

It should be noted that the type of stabilizer constituting the present invention is such that in using the machine for lifting a load where a crane is employed, as distinguished from when the machine is in transit, the stabilizers are effective though the machine may be on an incline, as distinguished from a level surface. In other words, if for any reason the axle 1 should not be parallel with the frame 2 as shown in Fig. 1, for instance, the stabilizers are under those conditions still effective.

It will be appreciated also that by rounding the lower end of the plungers 8 as shown at 12, I am always assured of a good bearing surface between the lower end of the plunger and the upper face of the axle 1.

It will be seen also that by making the hooked members 9 slightly deeper than the axle 1 my improved stabilizer may be applied to units comprising axles which by reason of their process of manufacture, or for any other reason, may vary slightly in depth or in contour.

It is evident that various modifications may be made in the construction above described within the purview of this invention.

What I claim is:—

1. A power unit comprising an axle, a load spring mounted thereon, stabilizing apparatus intermediate the axle and the load at each side of the load, said apparatus having a portion rigid with the load and a portion movable with respect to the first-mentioned portion cooperable with the axle, and a hook carried by the movable portion of the stabilizer and having a portion underlying the axle for preventing relative movement between the axle and the spring-mounted load.

2. A power unit comprising a front axle, a load, a spring for mounting the load on the axle, stabilizing apparatus intermediate the axle and the load at each side of the load, said apparatus having a portion rigid with the load and a portion movable with respect to the first-mentioned portion and cooperable with the axle, a hook rigid with the movable portion of the stabilizer and having a portion underlying the axle to prevent flexing of the spring and hence relative movement between the load and the axle.

3. A power unit comprising a front axle, a load, a spring intermediate the load and the axle for supporting the load on the axle, stabilizing devices intermediate the axle and the load at each side of the load, each one of said devices comprising a portion rigid with the load and a portion movable with respect to the first-mentioned portion and cooperable with the axle, and unitary means for locking both devices, so that each movable portion is no longer movable with respect to the corresponding rigid portion, to prevent flexing of said spring and hence relative movement between the axle and the load.

4. A power unit comprising an axle, a load, a spring intermediate the load and the axle for supporting the load on the axle, stabilizing mechanism intermediate the load and the axle, said stabilizing mechanism comprising a bearing fixed to the load, a movable member in said bearing and adapted to engage the axle, a hook carried by the movable member and having a portion underlying the axle, movement of the movable member in its bearing being permitted during transit of the power unit to permit the spring to yield and the axle to move relatively to the load, and means for locking said movable member against movement in its bearing with the movable member in contact with the axle to prevent yielding of the spring and thus to prevent the axle from moving relatively to the load.

5. In a power unit the combination of a front axle, a load, a spring for supporting the load on the axle, whereby the axle and the load are movable relatively, stabilizers at each side of the load and each comprising a plunger immediately above the axle, a bearing for each plunger rigidly secured to the load, a hook carried by each plunger and underlying the axle, means for locking the plungers against movement in their respective bearings to prevent movement of the spring and hence relative movement between the load and the axle, and lock releasing means for the stabilizers operable from the control station of the power unit.

6. In a power unit a front axle, a load, a spring suspending the load from the axle, a stabilizer intermediate the load and the axle, the stabilizer comprising a bearing rigid with the load, a plunger movable in the bearing and cooperating with the axle, means carried by the plunger cooperating with the axle to prevent relative movement between the plunger and the axle, and means for locking the plunger in the bearing to prevent movement of the spring and hence relative movement between the axle and the load.

7. In a power unit a load, a spring for suspending the load from the axle, a stabilizer comprising a bearing rigid with the load, a plunger movable in the bearing, means for locking the plunger in the bearing, the plunger when locked in the bearing in engagement with the axle limiting movement of the load toward the axle, and means carried by the plunger and cooperating with the axle to prevent movement of the load in the opposite direction when the plunger is locked in its bearing.

8. In a power unit, the combination of a load, a front axle so mounted as to be capable of oscillation in a vertical plane with respect to the load, two bearings, one secured rigidly to each side of the load, two non-flexible members secured to the axle, one adjacent each end thereof, and each arranged for translation in one of the bearings, and unitary means for simultaneously locking both such members in their respective bearings.

9. In a power unit, the combination of a load, a front axle so mounted as to be capable of oscillation in a vertical plane with respect to the load, two members, one secured rigidly to each side of the load, two members secured to the axle, one adjacent each end thereof, and each arranged for translation with respect to one of the first-named members, and unitary means for simultaneously locking each of the first-named members to its respective second-named member.

10. A power unit comprising a front axle, a load, a spring intermediate the load and the axle for supporting the load on the axle, stabilizing devices intermediate the axle and the load at each side of the load, each one of said devices comprising a portion rigid with the load and a portion movable with respect to the first-mentioned portion and secured to the axle, and means for locking said movable portions in contact with the axle, to prevent flexing of said spring and hence relative movement between the axle and the load.

11. In a tractor crane, the combination of: a traction base, including a front axle; a crane frame; a control station; means for supporting the crane frame on the axle; stabilizing devices, intermediate the axle and the crane frame, at each side of the crane frame, each one of the said stabilizing devices comprising a portion movable in unison with the crane frame, and a portion movable with the axle, and freely movable with respect to the first-mentioned portion; and means, controllable from the control station, for locking said portions together, to prevent relative movement between the axle and the crane frame.

12. In a tractor crane, the combination of: a crane frame; a control station; a front axle, so mounted as to be capable of oscillation in a vertical plane with respect to the crane frame; two members, one movable in unison with each side of the crane frame; two members, one adjacent each end of the axle and movable in unison therewith, and each arranged for free translation with respect to the corresponding one of the first-named members; and means, controllable from the control station, for simultaneously locking each of the first-named members to its respective second-named member.

13. A power unit comprising an axle, a load, a spring intermediate the load and the axle for supporting the load on the axle, stabilizing devices intermediate the axle and the load at each side of the load, each one of said devices comprising a portion rigid with the load and a portion movable with respect to the first-mentioned portion and cooperable with the axle, and unitary means for locking both devices, so that each movable portion is no longer movable with respect to the corresponding rigid portion, to prevent flexing of said spring and hence relative movement between the axle and the load.

14. In an automotive truck the combination of a brace bar extending between sprung and unsprung parts of the chassis and attached to one of said parts, a guide for the bar attached to the other of said parts and freely accommodating the bar to relative movement of said parts during normal running of the truck and clamping mechanism for the bar operable to secure the same against movement relatively to said guide.

15. The combination of the claim 14 in which said bar is provided with teeth throughout a portion of its length adjacent said guide and said mechanism includes a bolt engageable with said teeth.

16. In an automotive truck, a pair of brace bars extending between sprung and unsprung parts of the chassis, one at each side thereof and each attached to one of said parts, guides for said bars attached to the other of said parts, and freely accommodating the bars to relative movement of said parts during normal running of the truck, clamping mechanisms for securing each of said bars against movement relatively to its guide and a single control connected to operate both said mechanisms.

17. In an automotive truck chassis, two chocks located between sprung and unsprung parts thereof, one on each side, including thrust members for each chock operable to lock said parts against relative movement, and balanced means for coincidently actuating said members.

18. In an automotive truck chassis, a pair of chocks located between sprung and unsprung parts thereof, one on each side, including a pair of opposed sliding bolts for clamping said parts against relative movement, and a common actuator for both said bolts operable to slide the same simultaneously into clamping position.

EDWARD F. OATES.